United States Patent [19]
Gilbert

[11] 3,872,852
[45] Mar. 25, 1975

[54] FOUR CYCLE ROTARY ENGINE WITH FLEXIBLE COMBUSTION CHAMBER WALL

[76] Inventor: Jack J. Gilbert, 3 River Rd., Suffern, N.Y. 10901

[22] Filed: June 25, 1973

[21] Appl. No.: 373,611

[52] U.S. Cl................... 123/193 R, 74/18.1, 92/64, 123/44 E, 123/55 AA, 418/45, 418/156
[51] Int. Cl................................................ F02f 1/00
[58] Field of Search............ 123/44 E, 55 R, 55 AA, 123/193 P, 193 R, 46 SC, 46 R, 197 A, 197 R, 191 R; 92/64, 101; 418/45, 156; 74/18.1

[56] References Cited
UNITED STATES PATENTS

| | | | |
|---|---|---|---|
| 1,231,302 | 6/1917 | Scott | 123/193 R |
| 1,550,703 | 8/1925 | Knott | 123/193 R |
| 1,793,904 | 2/1931 | Caminez | 123/44 E |
| 2,084,496 | 7/1934 | Lockwood | 123/193 R |
| 2,545,774 | 3/1951 | Griswold | 92/101 |
| 2,853,024 | 9/1958 | Bruce | 92/101 |
| 3,295,505 | 1/1967 | Jordan | 418/45 |
| 3,507,585 | 4/1970 | Mercer | 418/45 |

FOREIGN PATENTS OR APPLICATIONS
374,834   12/1929   United Kingdom........ 123/55 AA Primary Examiner—Manuel A. Antonakas
Assistant Examiner—Daniel J. O'Connor
Attorney, Agent, or Firm—Brooks Haidt & Haffner

[57] ABSTRACT

A rotary combustion engine having one, two or three combustion chambers formed by an inner peripheral wall and end walls of a housing and respectively, one, two and three flexible and resilient reeds, each reed being slidably received at its ends by supports pivotally mounted on the housing, a rotor having a pair of rollers spaced from the axis of rotation of the roller, the rotor being mounted so that the rollers engage and alternately bend and release the reed or reeds thereby changing the volume of the combustion chamber or chambers, valve means driven by the rotor to permit the feeding of a combustible gas to the chamber or chambers, the compression and combustion thereof and the expulsion of the combustion products and means for igniting the combustion gas when it is compressed.

17 Claims, 9 Drawing Figures

FOUR CYCLE ROTARY ENGINE WITH FLEXIBLE COMBUSTION CHAMBER WALL

This invention relates to rotary combustion engines and particularly to a rotary combustion engine in which the rotary driven part, or rotor, is not exposed to the combustion gases, but is separated therefrom by flexible walls which define one wall of the combustion chamber or chambers.

So called "rotary" engines are well-known in the art, and one major problem with certain types is with the seals required between the rotary driven part and other parts, such as the surrounding housing. For example, the seals must not only be able to withstand the pressure and temperature of the combustion gases but also be able to withstand the wear caused with high rotation speeds. Problems are also encountered in lubricating and cooling such seals.

Other known types of rotary engines require noncircular paths for the rotor, or non-circular relative movement between the rotor and its surrounding parts, a complicated mechanical coupling between the rotor and the output shaft of the engine and/or combustion chambers of relatively complicated geometrical shape.

One object of the invention is to provide a rotary engine which does not require seals between the rotor and other parts which are subjected to combustion gases.

Another object of the invention is to provide a rotary engine having a symmetrical rotor which is merely rotated around its axis of symmetry and the output shaft of which may be the supporting shaft for the rotor and be driven by the rotor without intervening mechanisms.

These and other advantages of the invention will be apparent from the following description of preferred embodiments thereof, which description should be considered in conjunction with the accompanying drawings, in which:

FIG. 6 is a side elevation view of a lamination forming part of the reed employed in the engine of the invention;

FIG. 7 is a cross-sectional view of a reed employed in the engine of the invention;

FIG. 8 is a diagrammatic showing of the ignition system employed with the embodiment shown in the preceding figures.

Figure 1:
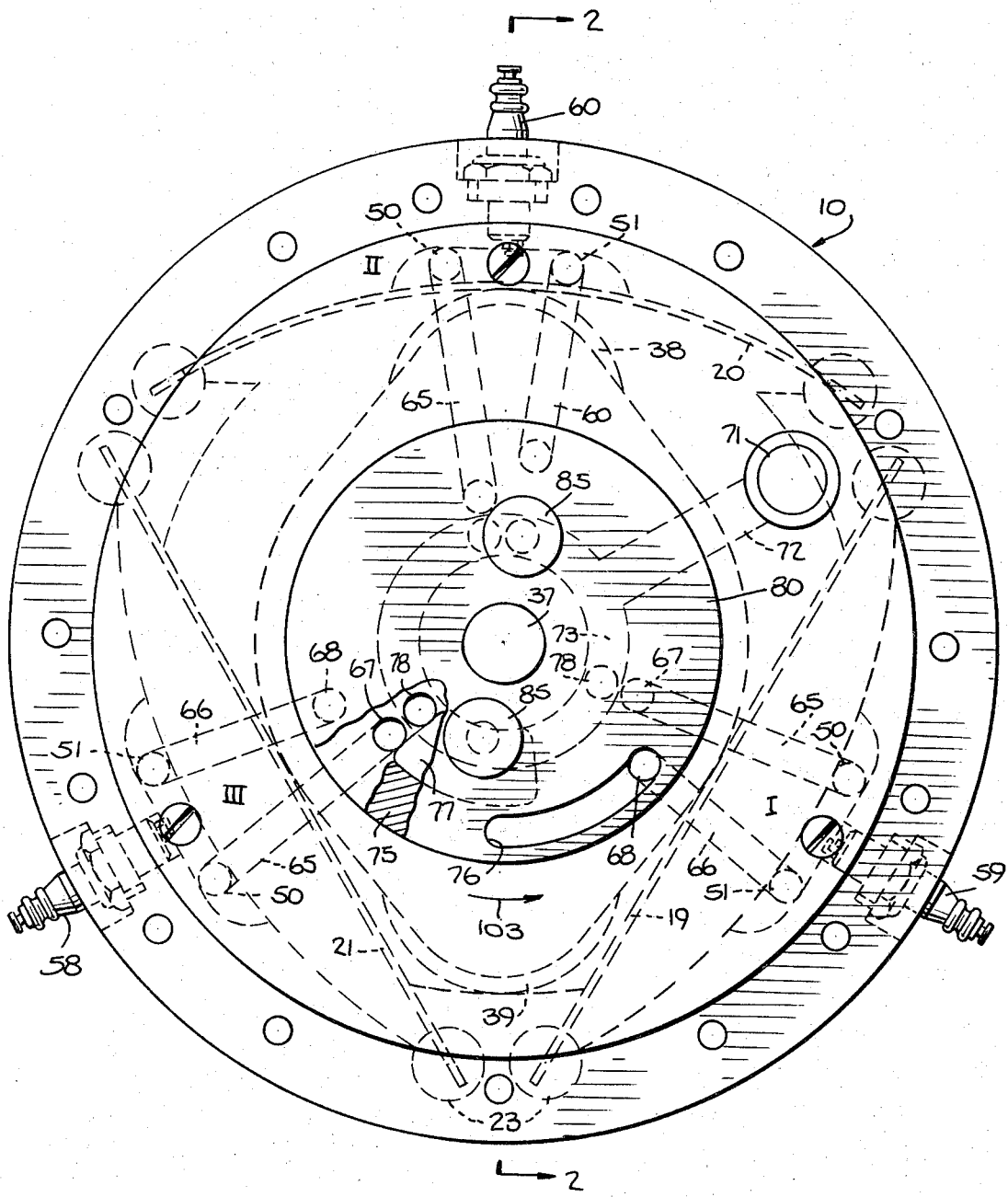
FIG. 1 is an end elevation view, partly broken away, of the preferred embodiment of the engine of the invention having three combustion chambers.
Figure 2:
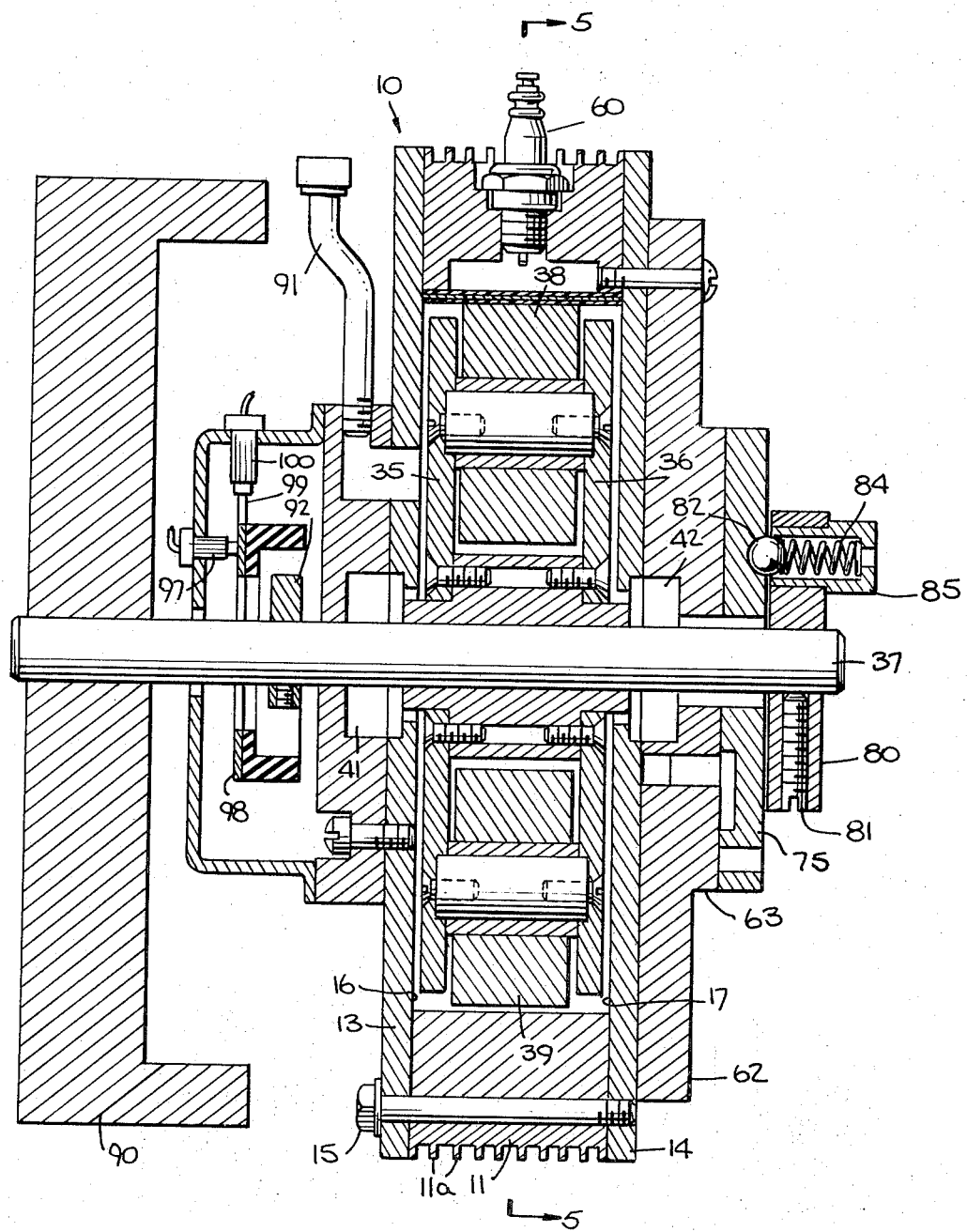
FIG. 2 is a cross-sectional view of the embodiment shown in FIG. 1 and is taken along the line 2—2 indicated in FIG. 1.
Figure 3:
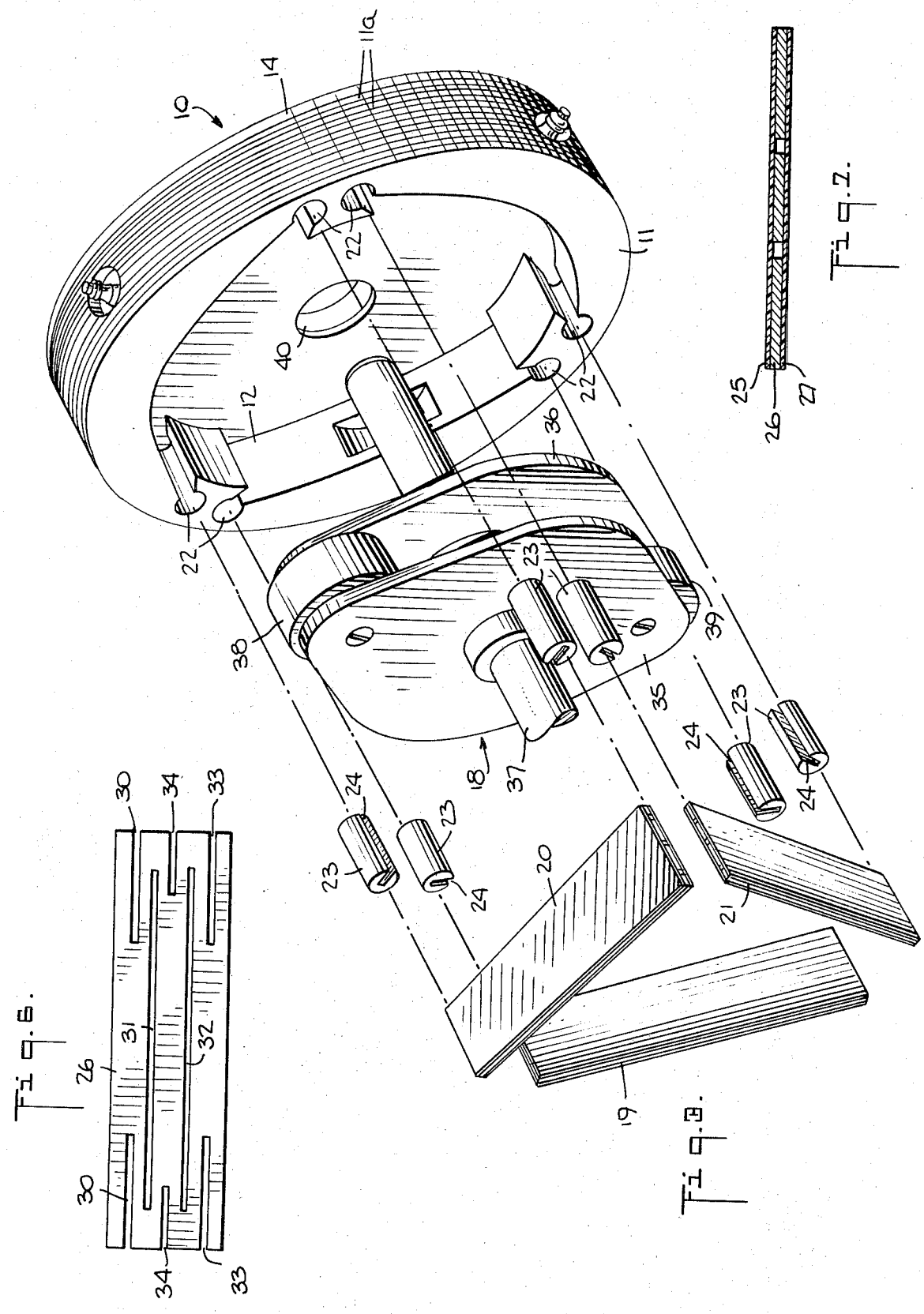
FIG. 3 is an exploded view of a portion of the embodiment shown in FIGS. 1 and 2.

With reference to FIGS. 1–5, the rotary engine of the invention includes a housing 10 comprising a central member or block 11 which may have cooling fins 11a, as indicated in FIGS. 2 and 3, and which has an inner peripheral wall 12. The housing 10 also comprises a pair of end plates 13 and 14 secured to opposite sides of the housing 10 in any conventional manner, such as by screws 15, to provide a pair of end walls 16 and 17, such end walls 16 and 17, together with the peripheral wall 12, forming a chamber for receiving a rotor 18 and three flexible and resilient reeds 19, 20 and 21.

The block 11 has a plurality of apertures 22 for receiving a corresponding number of pins 23, the pins 23 being pivotable in the apertures 22 and each pin having a slot 24 therein for receiving the end of a reed 19, 20 or 21. The pivot axes of the pins 23 are substantially parallel to the peripheral wall 12 and the slots 24 extend parallel to such pivot axes.

The reeds 19-21 preferably are identical and are flexible and resilient. Preferably, the reeds 19–21 comprise three laminations 25, 26 and 27 as shown in FIGS. 6 and 7. The two outer laminations 25 and 27 are imperforate, and preferably are made of a material such as spring steel able to withstand the temperatures encountered during operation of the engine. The center lamination 26 may also be made of the same spring steel, but it may also be made of other materials, such as bearing bronze. The center lamination 26 has a plurality of slots 30, 31, 32, 33 and 34 which may be distributed as shown in FIG. 6, so that the lamination 26 may be compressed widthwise and the compression forces will be substantially equally distributed throughout the lamination 26. One of the laminations 25 or 27 faces the interior of the combustion chamber hereinafter described, and the other lamination 25 or 27 is engaged by the rotor 18 as hereinafter described. Although the laminations 25 and 27 have a width substantially equal to the spacing between the end walls 16 and 17, so as to substantially prevent the blow-by of gas within the combustion chamber, the principal seal between the end walls 16 and 17 and the reed 19, 20 or 21 is provided by the lamination 26, which is maintained under slight compression by the end walls 16 and 17. If desired, the lamination facing away from the interior of the combustion chamber may be omitted.

The rotor 18 comprises a pair of spaced plates 35 and 36 carried on and secured to a shaft 37 which is the output shaft of the engine. The axis of the shaft 37 extends substantially parallel to the peripheral wall 12 and to the pivot axes of the pins 23. A pair of rollers 38 and 39 are rotatably carried by the plates 35 and 36, the axes of rotation of the rollers 38 and 39 being spaced from the axis of the shaft 37 and being substantially parallel to the axis of the shaft 37. The plates 13 and 14 have holes, such as the hole 40, through which the shaft 37 passes and the shaft 37 is supported by a pair of bearings 41 and 42 received in recesses in the plates 13 and 14.

Figure 5:
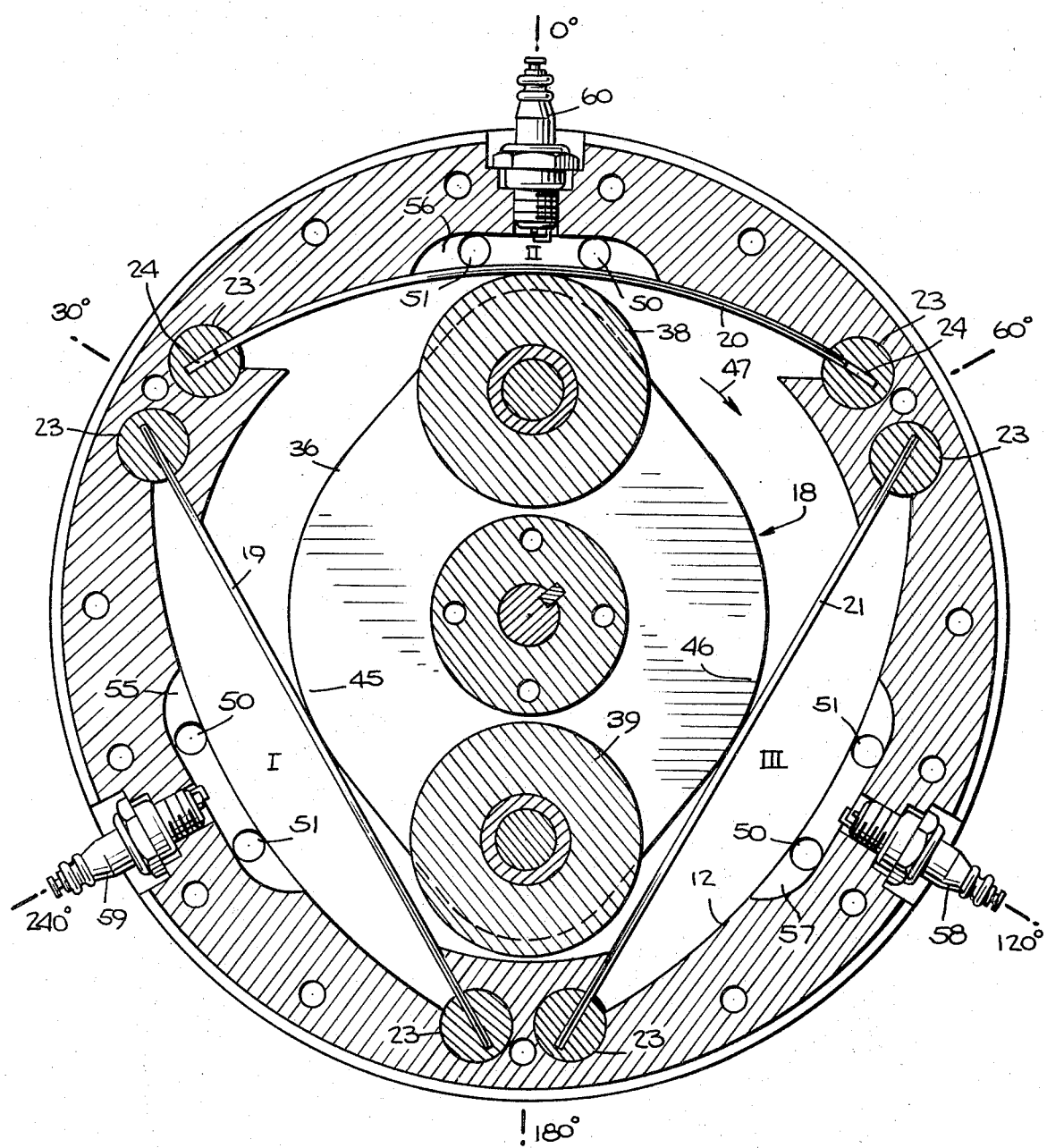
FIG. 5 is a cross-sectional view of the embodiment shown in the preceding figures and is taken along the line 5—5 indicated in FIG. 2.

From an examination of FIG. 5, it will be observed that the reeds 19 and 21 are substantially flat and are, therefore, in their normal positions. In such positions, they engage the central portions 45 and 46 of the rotor 18 which limit inward movement of the reeds 19 and 21. It will also be noted that the rollers 38 and 39 are positioned on the rotor 18 so that the surfaces thereof most remote from the axis of the shaft 37 are farther from the axis of the shaft 37 than the inner surfaces of the reeds 19 and 21 in their normal positions. Accordingly, as the rotor 18 is rotated in the direction indicated by the arrow 47, the rollers 38 and 39 engage the reeds and successively bend them toward the inner peripheral wall 12. FIG. 5 illustrates the roller 38 in engagement with the reed 20, which, in the position of the rotor 18 shown in FIG. 5, is bent away from its normal position to the maximum extent. When the reed, such as the reed 20, is so bent it may engage the inner peripheral wall of the block 11 as shown in FIG. 5. When the roller 38 moves away from the reed 20, by reason of the rotation of the rotor 18, the reed 20 returns, by reason of its resiliency, to its normal position which corresponds to the normal position shown for the reeds 19 and 21 in FIG. 5.

It will also be noted from FIG. 5 that when the reeds are in their normal positions, e.g., the positions of reeds 19 and 21, the ends thereof are against, or substantially against, the bottoms of the slots 24 in the pins 23, whereas when the reeds are bent the ends of the reeds move away from the bottom of such slots as illustrated by the positions of the ends of the reed 20 in FIG. 5. At the same time that the reeds are bent, the pins 23 at the ends thereof pivot about their axes. In this way, the reeds 20 are permitted to bend without creating any localized strain therein as would be the case if the reeds were required to bend at their supports. The sliding fit between the ends of the reeds 19–21 and the walls of the slots 24 of the pins 23 and between the pins 23 and the block 11 is such as to provide a substantially gas-tight fit between the ends of the reeds 19–21 and the block 11.

From the foregoing description it will be apparent that the reeds 19–21 subdivide the chamber between the inner peripheral wall 12 and the end walls 16 and 17 into three smaller chambers I, II and III, which are the combustion chambers of the engine. As the rotor 18 rotates and bends the reeds 19–21, the volumes of the combustion chambers I, II and III reduce and as the reeds 19–21 are permitted to return to their normal positions, the volumes of the combustion chambers I, II and III increase. It will be observed from an examination of FIG. 5 that only one reed 19, 20 or 21 is bent at any given time to the position shown for the reed 20, but it will also be noted that as the roller 38 releases the reed 20, the roller 39 bends the reed 19 so that when the reed 19 is fully bent by the roller 39, both reeds 20 and 21 are in their normal positions. Similarly, as the reed 19 is released, the reed 21 is bent, and when the reed 21 is fully bent the reeds 19 and 20 are in their normal positions.

Each of the combustion chambers I, II and III has a pair of ports 50 and 51 to permit the flow of gases into and out of the combustion chambers, the port 50 being an inlet port and the port 51 being an outlet or exhaust port. As described hereinafter, the combustion gases are exhausted through the outlet port 51 and a combustible gas is drawn into the combustion chambers through the port 50.

As a reed 19, 20 or 21 is bent toward the peripheral wall 12 by the rotor 18, the gas contained within the associated combustion chamber is compressed if the ducts connected with the ports 50 and 51 are closed. Thus, the volume of gas within the volume of the combustion chamber when a reed is in its normal position is compressed to a volume substantially equal to the volume of the cavity in the block 11, such as the cavity 55, 56 or 57. When the combustible gas is so compressed, it may be ignited by means of a spark plug 58, 59 or 60, with its associated electrical ignition apparatus.

Figure 4:
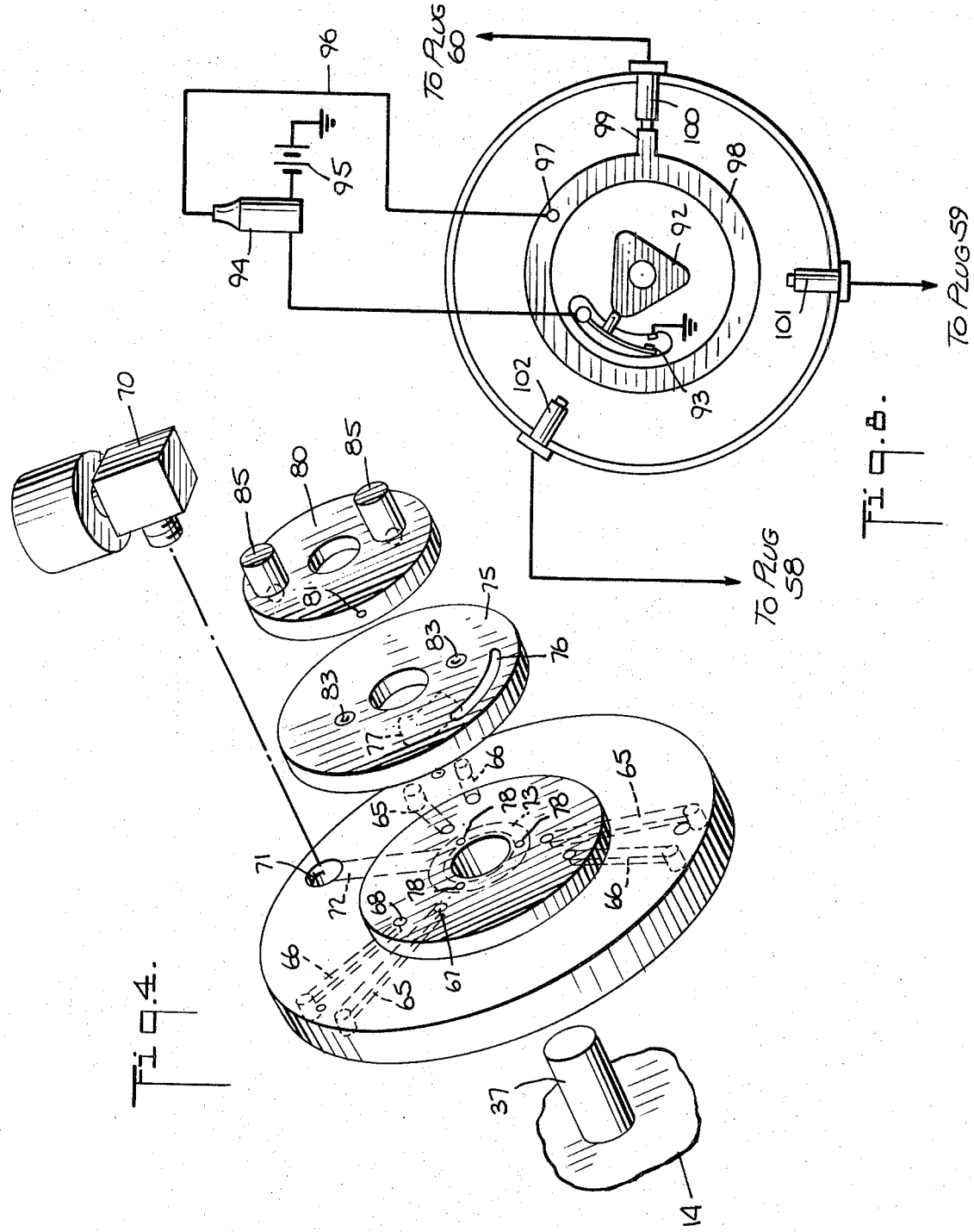
FIG. 4 is an exploded view of another portion of the embodiment shown in FIGS. 1 and 2.

The ducts for the ports 50 and 51 are provided by a duct plate 62 having a raised portion 63 (FIG. 4). The duct plate 62 may be secured to the end plate 14 in any suitable manner, and so to provide a gas-tight fit therewith. The duct plate 62 has a plurality of channels 65 and 66 (FIGS. 1 and 4) which, at their outer ends, extend respectively to the inlet port 50 and the outlet port 51, and which, at their inner ends, extend to openings 67 and 68 in the raised portion 63 of the duct plate 62. Thus, when an opening 68 is uncovered, exhaust gases are vented therethrough, and when the opening 67 is uncovered, combustible gases may be fed therethrough to the channel 65.

A conventional carburetor 70 is secured to the duct plate 62 at the opening 71 and feeds a gasoline-air mixture to the channel 72 in the duct plate 62 which, at its inner end, communicates with a circular channel 73 in the raised portion 63.

The uncovering and covering of the openings 67 and 68 are controlled by a valve plate 75 having an arcuate slot 76 therethrough for venting exhaust gases and having an arcuate channel 77 in the surface thereof facing the raised portion 63 which serves to interconnect the openings 67 with openings 78, the openings 78 communicating with the circular channel 73. The facing surfaces of the raised portion 63 and the valve plate 75 are ground so as to provide a gas-tight fit therebetween.

The valve plate 75 is rotated by a driving plate 80 which is mounted on and secured to the shaft 37. The driving plate 80 may, for example, be secured to the shaft 37 by one or more set screws 81. The driving plate 80 is interconnected with, and drives, the valve plate 75 by a pair of balls 82 received in depressions 83 in the valve plate 75 and pressed against the valve plate 75 by springs 84 received in bushings 85 secured to the driving plate 80. Thus, the valve plate 75 is pressed against the raised portion 63 of the duct plate 62, but, because of the ball and spring connection, is free to adapt its position so that the facing surfaces of the valve plate 75 and the raised portion 63 are maintained in gas-tight relation.

As illustrated in FIG. 2, a fly wheel 90 may be mounted on the shaft 37 for conventional purposes, and the space within the reeds 19–21 may be filled with oil for lubricating and cooling purposes through the oil pipe 91.

As shown in FIGS. 2 and 8, the combustible gas in the combustion chambers I, II and III may be ignited by the spark plugs 58–60 connected as shown in FIG. 8. The ignition system comprises a cam 92 operating points 93 which are connected to the primary of the ignition coil 94 in series with a battery 95. The secondary of the ignition coil 94 is connected at one end to ground and at the other end through a reed 96 to a brush 97 engaging a conductive rotor 98. The rotor 98 has an outwardly extending portion 99 which supplies the high voltage to the plugs 58–60 through brushes 100, 101 and 102. Thus, when contacts 93 are opened and the portion 99 is in the position shown in FIG. 8, high voltage is supplied to the plug 60 causing it to ignite the combustible gas in the combustion chamber II. The ignition system similarly supplies high voltage to the plugs 59 and 58 when the portion 99 is adjacent the brushes 101 and 102.

From the description given hereinbefore, it will be apparent to those skilled in the art that, as the rotor 18 makes one revolution, there will be three firings of the combustible gas so that there will be three power "strokes" for each revolution of the rotor 18. Thus, assuming that when the rotor 18 is in the position shown in FIG. 5, the combustion chamber II contains a compressed combustible gas and high voltage is supplied to the spark plug 60, then the rotor 18 will be driven by the expansion of the ignited combustible gas in the direction indicated by the arrow 47. Assuming also that the combustion chamber I had previously been filled with a combustible gas which had been ignited previously, then the combustion chamber I will be filled with combustion gases so that when the rotor 18 moves clockwise, as viewed in FIG. 5, due to the expansion of the gas in the combustion chamber II, the roller 39 will bend the reed 19 exhausting combustion gases through the port 51. When the roller 38 on the rotor 18 reaches the position indicated as 60° in FIG. 5, then the roller 39 will bend the reed 19 to a position corresponding to the reed 20 in FIG. 5.

As the rotor 18 continues to rotate, the roller 39 will release the reed 19 permitting it to move toward the normal position thereof shown in FIG. 5, and drawing a combustible gas into the chamber I through the port 50. At the same time, the roller 38 will bend the reed 21 toward the peripheral wall 12 compressing combustible gas which had previously been taken into the combustion chamber III through the port 50. When the roller 38 reaches the position indicated as 120° in FIG. 5, high voltage will be supplied to the plug 58 igniting the gases in the combustion chamber III thereby causing the rotor 18 to move until it reaches the position indicated as 180° in FIG. 5. While the roller 38 is moving from the 120° to the 180° position, the roller 39 is bending the reed 20 causing the combustion gases to be expelled through the port 51.

The roller 39 then bends the reed 19 compressing the combustible gas therein and the roller 38 releases the reed 20 causing the intake of a combustible gas through the port 50. Accordingly, when high voltage is supplied to the spark plug 59, the combustible gas in the combustion chamber I is ignited driving the rotor 18 toward the 300° position and causing an intake of a combustible gas into the combustion chamber II.

Assuming that the direction of rotation of the rotor 18 is indicated by the arrow 47 in FIG. 5 and that the roller 38 is at the 0° position as indicated in FIG. 5, the sequence of operation in the combustion chambers I-III is as set forth in the following Table I.

From an examination of FIGS. 1 and 4, it will be apparent to those skilled in the art that the valve plate 75 opens and closes the ports 50 and 51 as required to provide the cycle of operations set forth in Table I. Thus, as viewed in FIG. 1, the direction of rotation of the valve plate 75 is as indicated by the arrow 103, and the exhaust port 51 of the chamber I is connected to the slot 76 permitting the combustion gases to be vented to the atmosphere through the slot 76. The slot 76 may, of course, be connected to a conventional exhaust and muffler system. FIG. 1 shows the slot 76 in the position when the reed 19 is about to be bent by the roller 39, and as the shaft 37 and the valve plate 75 move through another 60° in the direction of the arrow 103, the opening 68 will be covered and the opening 67 will be connected with the opening 78 through the channel 77 thereby causing a gasoline-air mixture to be drawn into the combustion chamber I through the channel 65 and the port 50, the gasoline-air mixture being supplied to the opening 78 through the channels 72 and 73 from the carburetor 70. The operation of the valve plate 75 is the same for the venting of combustion gases and the intake of combustible gases for the chambers II and III. It will also be noted that the ducts for the ports 50 and 51 are closed when the opening at the inner end of the channel 66 is not uncovered by the slot 76 and when the openings 67 and 78 are not interconnected by the channel 77.

Figure 9:
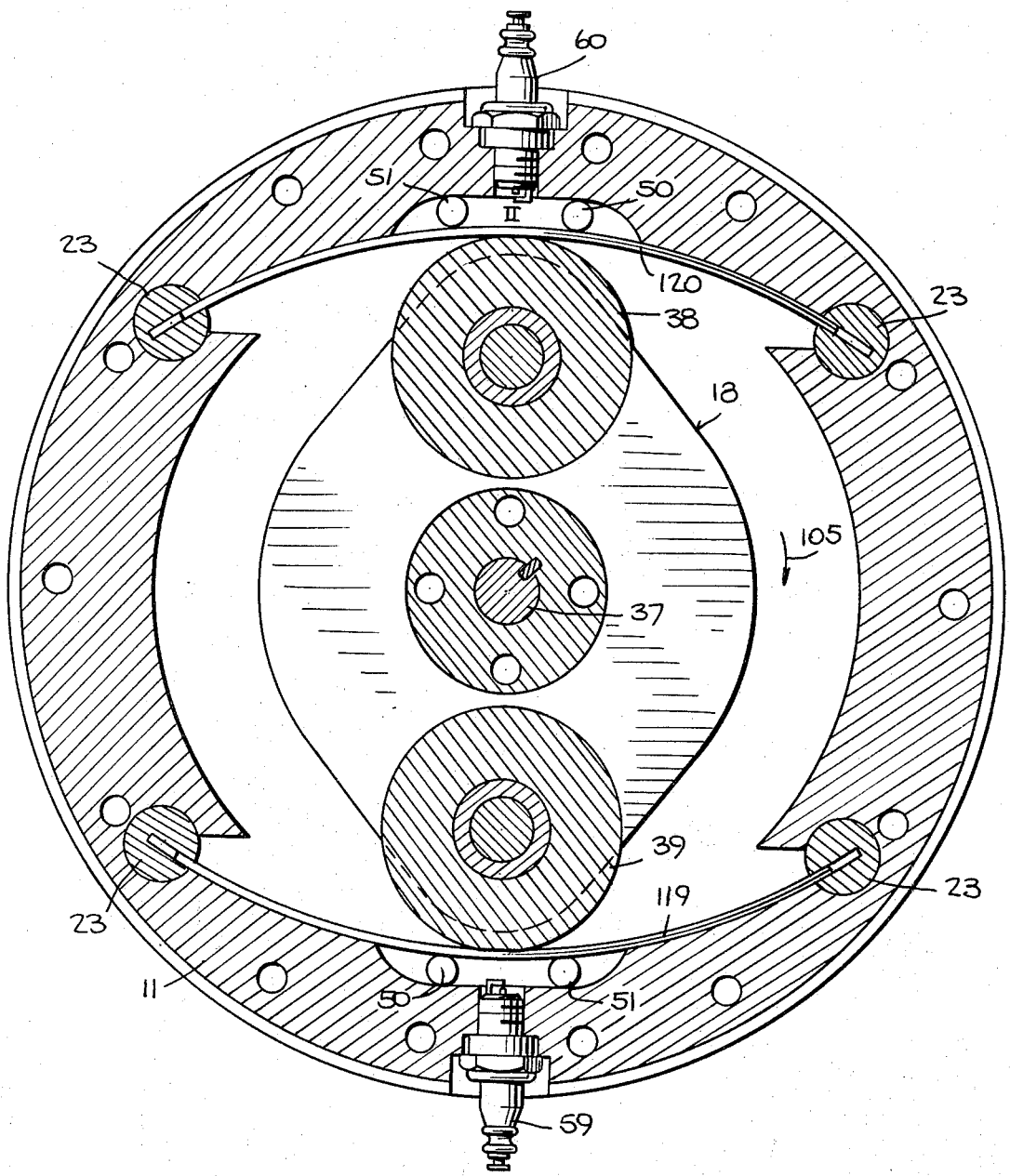
FIG. 9 is a cross-sectional view similar to FIG. 5 illustrating a modified embodiment of the engine of the invention having only two combustion chambers.

The engine illustrated in FIGS. 1-8 comprises three combustion chambers, but the principles of the invention are equally applicable to rotary engines having a greater or lesser number of chambers. FIG. 9 illustrates an embodiment having only two combustion chambers I and II, and two reeds 119 and 120 corresponding respectively to reeds 19 and 20. The remaining parts of the embodiment shown in FIG. 9 which are identical to the parts in the preceding figures are identified by the same reference numerals.

With the embodiment shown in FIG. 9, the duct plate 62 and the valve plate 75 will be modified in a manner which is obvious to those skilled in the art to provide the required exhausting of combustion gases and intake of combustible gases. Similarly, the ignition system shown in FIGS. 2 and 8 would be modified in a manner obvious to those skilled in the art to provide ignition of the combustible gases in the chambers I and II twice during each revolution of the rotor 18.

Assuming that the combustion chamber II shown in FIG. 9 has previously been filled with a combustible gas through the port 50, and that such gas has been com-

TABLE I

| | Position of Rotor - Degrees | | | | | | | | | | | |
|---|---|---|---|---|---|---|---|---|---|---|---|---|
| | 0 | 60 | 60 | 120 | 120 | 180 | 180 | 240 | 240 | 300 | 300 | 360 or 0 |
| Chamber I condition | Rest with exhaust gases | Exhaust of gases | Peak exhaust | Intake of fuel | Rest fueled | Rest fueled | Rest fueled | Compression | Fire | Expansion | Rest with exhaust gases | Rest with exhaust gases |
| Chamber II condition | Fire | Expansion | Rest with exhaust gases | Rest with exhaust gases | Rest with exhaust gases | Exhaust of gases | Peak exhaust | Intake of fuel | Rest fueled | Rest fueled | Rest fueled | Compression |
| Chamber III condition | Rest fueled | Rest fueled | Rest fueled | Compression | Fire | Expansion | Rest with exhaust gases | Rest with exhaust gases | Rest with exhaust gases | Exhaust of gases | Peak exhaust | Intake of fuel | pressed when the reed 120 is bent to the position shown in FIG. 9, then a high voltage is supplied to the spark plug 60 causing the expanding gases to drive the rotor 18 through the roller 38 and causing the rotor 18 to rotate in the direction indicated by the arrow 105. At the same time, the roller 39 releases the reed 119 causing it to draw a combustible gas into the chamber I through the port 50.

When the roller 39 reaches the reed 119 it bends the reed 119 causing the gases of combustion to be expelled through the port 51. At the same time, the roller 38 bends the reed 120, compressing the combustible gas in the chamber II and when the position of the rollers 38 and 39 have been reversed, as viewed in FIG. 9, then high voltage is supplied to the spark plug 59 igniting the gas therein, which causes the rotor 18 to be driven in the direction indicated by the arrow 105. As the rotor 18 is so driven, the roller 38 releases the reed 119 causing a combustible gas to be drawn into the chamber II through the port 50. Thereafter, the cycle of operations is repeated.

With the embodiment illustrated in FIG. 9, there are two power "strokes" per revolution of the rotor 18. However, it will also be apparent to those skilled in the art that the reed 119, the spark plug 59 and the ports 50 and 51 adjacent thereto may be omitted so that only a single power "stroke" is produced for each revolution of the rotor 18, the operation being the same as that described in connection with FIG. 9 except that only a single combustion chamber II is employed.

It will be apparent from the description given hereinbefore that the rotary engine of the invention does not require seals between the rotor and other parts which must be able to withstand the combustion gases. Also, it will be apparent that the rotor of the engine of the invention is symmetrical with respect to the axis of rotation and no complicated relative movement between the rotor 18 and the block 11 is required. In addition, it will be noted that that shaft 37 carrying the rotor 18 may be used as the output shaft of the engine, and it is unnecessary to provide any complicated mechanisms between the rotor and the output shaft or between the output shaft and the various parts for controlling the operation of the engine.

Although preferred embodiments of the present invention have been described and illustrated, it will be understood by those skilled in the art that various modifications may be made without departing from the principles of the invention.

What is claimed is:

1. A rotary combustion engine comprising a housing, a flexible wall extending across a portion of said housing to form with said housing a combustion chamber having a plurality of walls, said flexible wall having a pair of side edges in sliding engagement with said housing and having a pair of ends, support means on said housing slidably and pivotally supporting said flexible wall at said ends, a rotor rotatably mounted on said housing and having a wall engaging portion which is radially spaced from the axis of rotation thereof and which travels around said axis for engaging and moving said flexible wall inwardly toward another wall of said chamber and permitting said wall to move away from said other wall as said rotor is rotated and thereby alternately reducing and increasing the volume of said chamber, fuel means for supplying a combustible gas to said chamber, and valve means driven by said rotor and connected between said fuel means and said chamber and between said chamber and the atmosphere for supplying said gas to said chamber during alternate ones of the movements of said flexible wall away from said other wall and for venting said chamber to the atmosphere during alternate ones of the movements of said flexible wall toward said other wall.

2. A rotary combustion engine as set forth in claim 1, further comprising ignition means including gas firing means in a wall of said chamber and timing means driven by said rotor for igniting said combustible gas in said chamber when said gas is therein and said flexible wall has been moved inwardly by said rotor.

3. A rotary combustion engine as set forth in claim 1, wherein said flexible wall comprises a flexible, resilient reed.

4. A rotary combustion engine as set forth in claim 3, wherein said reed comprises a plurality of relatively long and narrow laminations at least one of said laminations having spaced slots therethrough extending lengthwise thereof but shorter than the length of said reed.

5. A rotary combustion engine as set forth in claim 4, wherein another of said laminations is substantially imperforate.

6. A rotary combustion engine as set forth in claim 3, wherein said support means is a pair of supports pivotally mounted on said housing, each of said supports having a slot therein for slidably receiving an end of said reed and both of said supports having their pivot axes extending substantially parallel to said ends of said reed.

7. A rotary combustion engine comprising a housing having an inner peripheral wall and a pair of end walls defining a first chamber; a pair of supports pivotally mounted on said housing at said peripheral wall in spaced relation therealong and with their pivot axes extending substantially parallel to said peripheral wall, each of said supports having slots therein extending substantially parallel to the pivot axis thereof; a flexible, resilient, relatively long and narrow reed having side edges and longitudinally spaced ends mounted in said first chamber with one end thereof slidably received in the slot in one of said supports and the other end thereof slidably received in the slot in the other of said supports, whereby said reed may be bent from a normal position toward and away from a first portion of said peripheral wall causing pivoting of said supports and sliding of said ends of said reed with respect to said supports, said side edges of said reed being in engagement with the surfaces of said end walls to define a combustion chamber intermediate said reed, said ends walls and said peripheral wall; a rotor rotatably mounted within said first chamber with its axis of rotation extending substantially parallel to said peripheral wall and intermediate said reed and a second portion of said peripheral wall different from said first portion thereof, said rotor having a reed engaging member rotatably mounted thereon with its axis of rotation spaced from said axis of rotation of said rotor and extending substantially parallel to said axis of rotation of said rotor, said reed engaging member being spaced from said axis of said rotor a distance greater than the spacing of said normal position of said reed from said axis of said rotor whereby as said rotor is rotated, said reed engaging member bends said reed toward said first portion of said peripheral wall and reduces the volume of said combustion chamber and alternately permits said reed to return to its normal position thereby increasing the volume of said combustion chamber; valve ports in a wall of said housing which bounds said combustion chamber for permitting the flow of gases into and out of said combustion chamber; valve means associated with said valve ports and connected to said rotor to be driven thereby for controlling the flow of gases into and out of said combustion chamber, said valve means successively preventing the flow of gas through said ports during a first bending and return of said reed by said reed engaging member, permitting the flow of gas through one of said ports during a second bending of said reed thereby and preventing the flow of gas through said one port but permitting the flow of gas through the other of said ports during the return of said reed after said second bending; and ignition means in a wall of said housing which bounds said combustion chamber and exposed to said combustion chamber for igniting a combustible gas therein.

8. A rotary combustion engine as set forth in claim 7, wherein said reed engaging member is a first roller and further comprising a second roller mounted on said rotor similarly to said first roller but on the opposite side of said axis of said roller.

9. A rotary combustion engine as set forth in claim 8, further comprising at least one further reed mounted on said housing similarly to said first-mentioned reed but spaced therefrom along said peripheral wall to form a further combustion chamber with said end walls and a portion of said peripheral wall different from said first portion thereof, said further reed being bendable by said rollers similarly to said first-mentioned reed and further valve ports in a wall of said housing which bounds said further combustion chamber and wherein said valve means comprises means for controlling the flow of gases into and out of said further combustion chamber in the manner in which it controls the flow of gases into and out of said firstmentioned combustion chamber and said ignition means comprises means for igniting a combustible gas in said further combustion chamber.

10. A rotary combustion engine as set forth in claim 9, wherein there are two further reeds each similarly mounted on said housing and in equally spaced relation to each other and said first mentioned reed around said peripheral wall to form two further combustion chambers similar to said first-mentioned combustion chamber and the gases into and out of which are controlled by said valve means in the same manner as said first-mentioned combustion chamber and wherein said ignition means comprises means for igniting a combustible gas in said combustion chambers in timed relation and when said combustible gas is compressed therein by the reed forming part of the combustion chamber.

11. A rotary combustion engine as set forth in claim 9, wherein said rotor is mounted on and secured to a shaft and said valve means comprises a plate mounted on said shaft for rotation therewith and a plurality of ducts interconnected with said ports, said plate having a plurality of spaced channels therein for opening and closing said ducts and thereby controlling the flow of gases through said ports.

12. In a rotary expansible chamber device comprising a housing having a wall forming one wall of said chamber and having at least one port opening into said chamber, a rotor rotatably mounted on said housing and having a portion which is radially sapced from the axis of rotation thereof and which travels around said axis, the combination therewith of a flexible, resilient reed forming a wall of said chamber, said reed being in sliding engagement at its side edges with said housing, and support means on said housing slidably and pivotally supporting said reed at its ends on said housing with an intermediate portion thereof in the path of movement of said portion of said rotor whereby upon rotation of said rotor, said reed is bent toward and away from said housing wall thereby alternately reducing and increasing the volume of said chamber.

13. A rotary device as set forth in claim 12, wherein said reed comprises a plurality of relatively long and narrow laminations at least one of said laminations having spaced slots therethrough extending lengthwise thereof but shorter than the length of said reed.

14. A rotary device as set forth in claim 13, wherein another of said laminations is substantially imperforate.

15. A rotary device as set forth in claim 12, wherein said support means is a pair of supports pivotally mounted on said housing, each of said supports having a slot therein for slidably receiving an end of said reed and both of said supports having their pivot axes extending substantially parallel to said ends of said read.

16. A rotary device as set forth in claim 15, wherein said reed comprises a plurality of laminations, at least one of said laminations being substantiall imperforate and another of said laminations having spaced slots therein which are shorter than the length of said lamination between the ends thereof received by said supports for permitting compression thereof in a direction transverse to the side edges thereof.

17. A rotary device as set forth in claim 16, wherein said laminations are made of metal and said other lamination is made of a metal different from the metal of said one lamination.

* * * * *

UNITED STATES PATENT OFFICE
CERTIFICATE OF CORRECTION

PATENT NO. : 3,872,852
DATED : March 25, 1975
INVENTOR(S) : Jack J. Gilbert

It is certified that error appears in the above-identified patent and that said Letters Patent are hereby corrected as shown below:

Abstract, line 15     "combustion" should be --combustible--

Column 7, line 39     "that" (2nd occurrence) should be --the--

Column 10, line 15 (Claim 12)    "sapced" should be --spaced--

Column 10, line 40 (Claim 15)    "read" should be --reed--

Signed and sealed this 13th day of May 1975.

(SEAL)
Attest:

RUTH C. MASON
Attesting Officer

C. MARSHALL DANN
Commissioner of Patents
and Trademarks